United States Patent
Smith

[15] 3,695,482
[45] Oct. 3, 1972

[54] PRESSURE VESSEL SEAL
[72] Inventor: Colin Smith, Upper Warlingham, Surrey, England
[73] Assignee: The Lummus Company, Bloomfield, N.J.
[22] Filed: June 14, 1971
[21] Appl. No.: 152,553

Related U.S. Application Data

[63] Continuation-in-part of Ser. No. 836,462, June 25, 1969, abandoned.

[52] U.S. Cl. .................. 220/46 MS, 220/3, 220/57
[51] Int. Cl. ....................... B65d 45/00, B65d 53/00
[58] Field of Search .......................... 220/46, 3, 57

[56] References Cited
UNITED STATES PATENTS 2,903,152   9/1959   Kuo ..................... 220/46 MS
3,159,302   12/1964   Latham et al. ........ 220/46 MS

*Primary Examiner*—George T. Hall
*Attorney*—Louis E. Marn et al.

[57] ABSTRACT

A pressure vessel including a sealing structure for the cover which comprises a triangularly-shaped gasket in sealing engagement with a curved shoulder on the cover, a gasket engaging surface of the vessel wall and a backing ring positioned between the gasket and a key-ring located in a groove in the vessel wall.

8 Claims, 3 Drawing Figures

INVENTOR.
Colin Smith

BY Marn & Jangarathis
ATTORNEYS

3,695,482

PRESSURE VESSEL SEAL

This application is a continuation-in-part of application Ser. No. 836,462, filed on June 25, 1969; abandoned.

This invention relates to high pressure metallic vessels and in particular to a sealing structure for sealing a removable closure to a wall of the vessel. It is particularly applicable to high pressure heat exchangers.

In a high pressure vessel of the kind above referred to it is recognized that the effect of relatively high pressure (500 lbs. per square inch and over) when applied to surfaces of considerable area (12 inches diameter and greater) causes a high gross load which must be resisted by the cover holding bolts in addition to the tension required to suitably compress a gasket into pressure-tight condition. With very high pressures of several thousands of pounds per square inch or more it becomes almost impossible to seal such a vessel for the lack of sufficient space for the necessarily large bolts.

Although remedies have been suggested for resisting the high gross load as for example by shear keys, many of the high pressure cover constructions have the gasket subjected directly or indirectly to the high internal pressure. In most cases, difficulties of effective sealing exist, not only because the gasket deforms under great load, but also because it is difficult to detect any specific point of leakage or to take any steps to correct it.

It is a main object of the present invention to provide a pressure vessel with a sealing structure which avoids the said difficulties.

According to the invention there is provided a pressure vessel having a wall surrounding an opening therein, a key-receiving groove extending around said wall adjacent to said opening, a gasket-engaging surface extending around the wall from the side of the key-receiving groove remote from the opening, a key-ring located in said groove and including a portion which projects from the groove into the vessel, a cover inserted through said opening into the vessel and including a shoulder arranged to face the gasket-engaging surface, a gasket of substantially triangular cross-section having one side engageable with the gasket-engaging surface and a second side engageable with said shoulder, and a backing ring engageable with the third side of the gasket and with said projecting portion of the key-ring. The shoulder is preferably curved towards the gasket-engaging face and the backing ring, and the key-ring preferably consists of a plurality of segments. The face of the gasket which engages the gasket-engaging face may be outwardly curved.

The pressure vessel also includes a pull-up member located in said opening, and rotatable pull-up elements extending through the pull-up member and into the cover and arranged to effect tightening and sealing of the gasket against the gasket-engaging surface, the shoulder, and the backing ring. A portion of the pull-up member is seated on a pull-up member receiving shoulder in the vessel and another portion of the pull-up member is seated on the key-ring, to take up dimensional tolerances.

The pressure vessel may include a jacking bar which extends across said opening, which is arranged to be secured to said wall, and which carries a cover-retaining bolt arranged to be screwed into the cover and to draw the cover into the initial assembly position thereof.

Jacking screws may be provided with the jacking bar and be operable on rotation thereof in one direction in the bar to engage the outer face of the cover and to break the seal between the gasket and the cover.

In order that the invention may be clearly understood one embodiment thereof will now be described, by way of example, with references to the accompanying drawings, in which.

Figure 1:
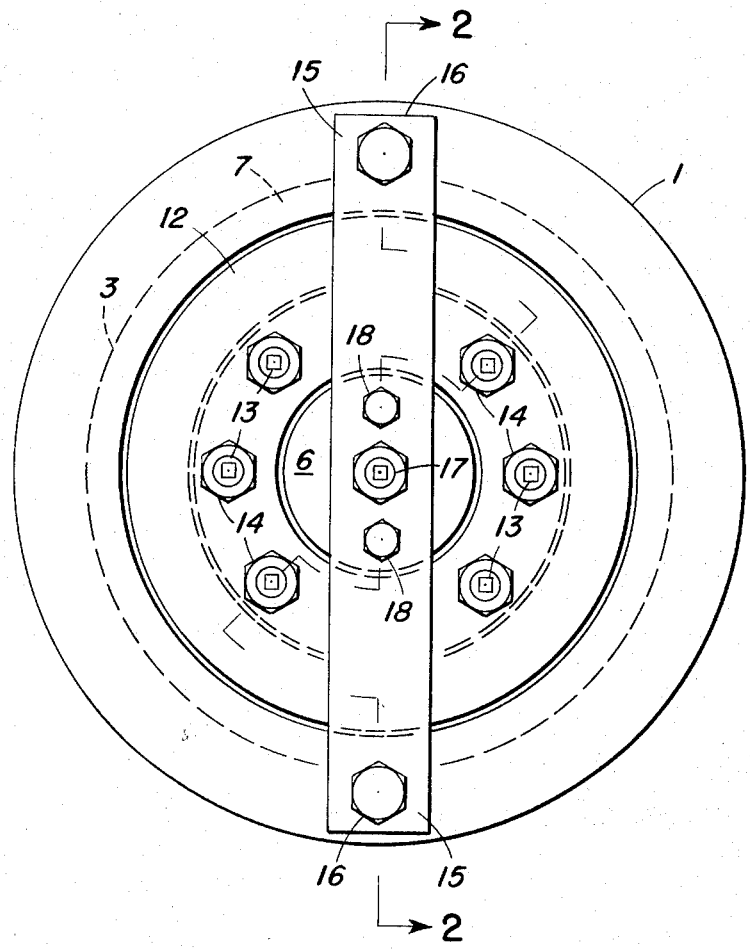
FIG. 1 is an end elevation of a pressure vessel according to the invention.
Figure 2:
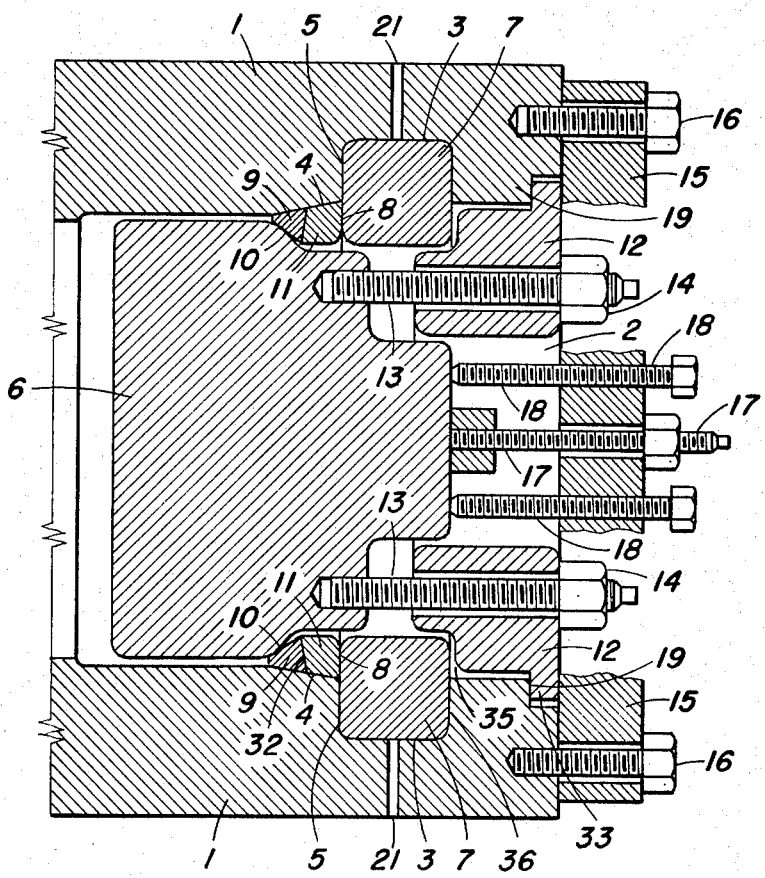
FIG. 2 is a section, with parts broken away, on line II—III, FIG. 1.

Referring to the drawings, the pressure vessel has a wall 1 surrounding an opening 2 therein and a key-receiving groove 3, FIG. 2, extends around the wall 1 adjacent to the opening 2. A gasket-engaging surface 4 is formed in and extends around the wall 1 from the side 5 of the key-receiving groove 3 which is remote from the opening 2. The gasket-engaging surface is outwardly tapered toward the opening 2 to facilitate insertion and removal of the gasket. A cover 6 is disposed in the vessel and a key-ring 7 is located in the groove 3 and includes a portion 8 which projects from the groove 3. The key-ring 7 preferably consists of a plurality of segments.

A gasket 9 of substantially trangular cross-section has one side engageable with the gasket-engaging surface 4, a second side which is engageable with a shoulder 10 on the cover 6, and a third side which is engageable with a backing ring 11, which latter is also engageable with the portion 8 of the key-ring. The shoulder 10 is curved towards the surface 4 and the backing ring to facilitate initial seating of the gasket 9 and provide point contact between the shoulder 10 and gasket 9. The shoulder 10 is preferably outwardly curved with a radius of curvature which is as large as possible to minimize local yielding on the gasket face. The third side of gasket 9 which is in engagement with the ring 11 is positioned at an angle greater than 90° with respect to surface 4 to assist in the radial displacement of gasket 4 upon application of pressure.

A pull-up member in the form of a pull-up ring 12 is located in the opening 2 and rotatable pull-up elements, shown as bolts 13, extend through the pull-up ring 12 and into the cover 6 and are provided with nuts 14 which on rotation thereof in one direction effect an initial tightening and seating of the gasket 9 against the gasket-engaging surface 4, the shoulder 10, and the backing ring 11.

The pull-up ring 12 is provided with a circular flange 33 which is seated on a pull-up ring receiving shoulder 19 which extends around the wall 1 between key-receiving groove 3 and opening 2. The lower portion of pull-up ring 12 is provided with a circular shoulder 35 which is adapted to seat on the portion of surface 36 of key-ring 7 which projects from key-receiving groove 3. In this manner, upon seating the gasket, dimensional tolerances are taken up thereby preventing any movement of the closure structure; i.e., upon seating the gasket, the cover 6, gasket 9, backing ring 11, key-ring 7 and pull-up ring 12 are drawn into respective engagement with each other, with inward movement being prevented by seating of flange 33 against shoulder 19 and outward movement being prevented by seating of the surface 36 of key-ring 7 against the upper surface of key-receiving groove 3.

A jacking bar 15 extends across the opening 2 and is secured by bolts 16 to the wall 1 of the vessel, and the bar 15 carries a cover-retaining bolt 17 which is screwed into the cover 6 and which is arranged to draw the cover into the initial assembly position thereof. Jacking screws 18 are also provided with the jacking bar 15 and are operable on rotation thereof in the bar 15 to engage the outer face of the cover 6 and to break the seal between the gasket 9 and the shoulder 10 of the cover 6.

When assembling the apparatus, the cover 6 is inserted into the opening 2 in the wall 1 and the gasket 9 is placed in position. The backing ring 11 is inserted on the gasket and then the segments of the key-ring 7 are located in the groove 3. The pull-up bolts 13, except those which will underlie the jacking bar, are screwed into the cover 6 and then the pull-up ring 12 is placed over the bolts 13 to rest against shoulder 19 on wall 1. The jacking bar 15 is now placed in position and secured by the bolts and cover-retaining bolt 17 is screwed into the cover 6 and nut 20 on bolt 17 is rotated to draw the shoulder 10, gasket 9, and backing ring 11 into engagement against the portion 8 of the key-ring.

Next the nuts 14 are applied to the pull-up bolts 13 and are rotated to effect the desired seating of the gasket 9 against the shoulder 10, the surface 4, and the backing ring 11. The backing ring 11 ensures that an even, uninterrupted, pressure is exerted on the gasket on the side thereof which is engaged by the backing ring.

At the point where the gasket 9 seats against the surface 4 a bearing load exists but the bearing stress across the surface 4 is restricted to a safe limit and as the area available for shear in the wall 1 is excessive in a plane at right angles to the surface 4 no local yielding takes place in the vessel and the load is dispersed over a large area. If the vessel is raised to its full test pressure and the pressure is then released, a leaking joint will occur if yielding of the gasket 10 has exceeded the compressing elastic limit. Should such yielding occur there will be a slackening of the pull-up bolts 13 and tightening of the bolts 13 will serve to retain a pressure-tight seal.

When dismantling the apparatus, the studs 13 which lie in the path of the jacking bar 15 are removed, the jacking bar is secured in position, and the jacking screws 18 are screwed into engagement with the cover. The remaining studs 13 are then removed and the jacking screws 18 are rotated to break the seal between the cover and the gasket. The jacking bar is now removed and, following removal of the pull-up ring 12, rods, not shown, are pushed into holes 21 to push out the key-ring sections. The jacking bar is again secured in position and its screw 18 screwed into the cover. The backing ring and gasket can now be removed, as can the cover.

Figure 3:
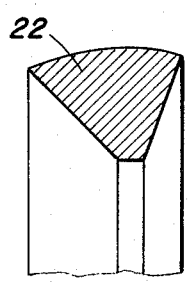
FIG. 3 illustrates the cross-section of a gasket which may be used with the pressure vessel.

If desired, instead of the gasket 9 having three flat sides in FIG. 2, the side which is to engage the gasket-engaging surface 4 may be outwardly curved as shown at 22, FIG. 3.

The present invention is particularly advantageous as a result of the following features:

1. The use of a triangular gasket

2. The point contact between the gasket and the cover; i.e., the gasket face is straight and the cover seat is curved.

3. The angular positioning between the gasket-engaging face of the vessel wall and the surface of the gasket which is in engagement with the backing ring, which facilitates radial displacement of the gasket upon application of pressure.

4. The outward taper of the gasket-engaging surface of the vessel wall which facilitates placement of the gasket.

5. The relationship between the pull-up ring and key-ring which takes up dimensional tolerances to thereby prevent movement of the closure structure.

Numerous modifications and variations of the present invention are possible in light of the above teachings and, therefore, within the scope of the appended claims the invention may be practiced other than as particularly described.

What is claimed is:

1. An apparatus comprising: a pressure vessel having a wall surrounding an opening therein, a key-receiving groove extending around said wall adjacent to said opening, a gasket-engaging surface extending around the wall at the side of the key-receiving groove remote from the opening, a key-ring located in said groove and including a portion which projects from the groove into the vessel, a cover inserted in said opening in the vessel and including a shoulder having a surface outwardly curved towards the gasket-engaging surface, a gasket of substantially triangular cross-section having one side in sealing engagement with the gasket-engaging surface, the second side in sealing engagement with said outwardly curved surface of said shoulder and the third side facing said key-ring a backing ring positioned adjacent to said wall between the key-ring and the third side of the gasket, said backing ring being in sealing engagement with the third side of the gasket and the key-ring.

2. The apparatus as claimed in claim 1 wherein said gasket engaging surface extends angularly outwardly toward said opening to facilitate removal of the gasket.

3. The apparatus as claimed in claim 1 wherein the third side of the gasket which is in sealing engagement with the backing ring is positioned at an angle greater than 90° with respect to the gasket engaging surface around said wall.

4. The apparatus as claimed in claim 1 and further comprising a pull-up member positioned in the opening; rotatable pull-up means extending through the pull-up member into the cover; a pull-up member-receiving shoulder extending around the wall between the key-receiving groove and said opening, an upper portion of said pull-up member being seated on said pull-up receiving shoulder and a lower portion of said pull-up member being seated on the portion of the key-ring which projects from the groove, whereby rotation of the pull-up means effects tightening and seating of the gasket and takes up dimensional tolerances.

5. The apparatus as defined in claim 4 and further comprising a jacking bar which extends across said opening and is secured to said wall, and a cover-retaining rotatable bolt extending through the jacking bar and screwed into the cover, whereby rotation of said bolt draws the cover into initial assembly position.

6. The apparatus as defined in clam 5 and further comprising jacking screws in the jacking bar, said jacking screws being rotatable within the bar to engage the outer face of the cover and to break the seal between the gasket and the cover.

7. An apparatus comprising: a pressure vessel having an open end, a key-receiving groove extending around the interior surface of said pressure vessel adjacent to the open end, a gasket-engaging surface extending around the interior surface of the vessel adjacent the side of the key-receiving groove remote from the open end of said vessel, a key-ring located in said groove and including a portion which projects from the groove into the vessel, a cover inserted in said vessel to close the open end thereof, the outer portion of the cover at the open end of the vessel, including an outwardly curved shoulder arranged to face the gasket-engaging surface, a gasket of substantially triangular cross-secton extending around the interior surface of the vessel, said gasket having one surface in sealing engagement with the gasket-engaging surface, a second surface in sealing engagement with said shoulder and a third surface facing said key-ring, a backing ring extending around the interior surface of the vessel positioned between the key-ring and the third side of the gasket, said backing ring having a first surface in engagement with said gasket-engaging surface extending around the interior surface of the vessel, a second surface opposite said first surface adjacent to and spaced form said cover, a third surface in engagement with said key-ring and a fourth surface opposite said third surface in sealing engagement with the third surface of the gasket.

8. The apparatus as claimed in claim 7 and further comprising a pull-up member positioned in the opening; rotatable pull-up means extending through the pull-up member into the cover; a pull-up member receiving shoulder extending around the wall between the key-receiving groove and said opening, an upper portion of said pull-up member being seated on said pull-up receiving shoulder and a lower portion of said pull-up member being seated on the portion of the key-ring which projects from the groove, whereby rotation of the pull-up means effects tightening and seating of the gasket and takes up dimensional tolerances.

* * * * *